June 22, 1965

W. MANDLER 3,190,175

WIDE ANGLE PHOTOGRAPHIC OBJECTIVE

Filed Oct. 22, 1962

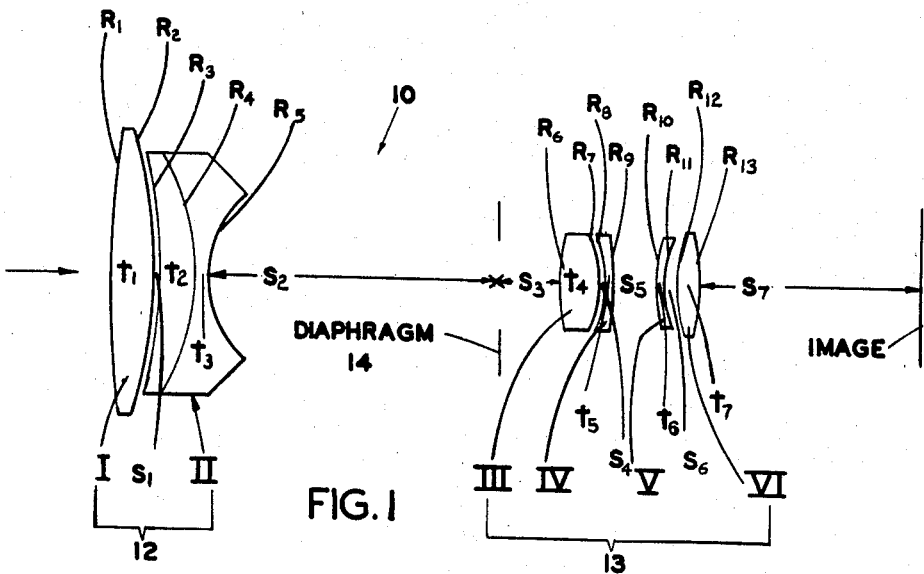

FIG. 1

| E.F.L. = 11.0 MM. B.F.L. = 22.2 MM. f/2.8 FIELD ANGLE = 64° | | | | | | |
|---|---|---|---|---|---|---|
| LENS | FOCAL LENGTH | RADII | THICKNESS | SPACES | $n_D$ | $\nu$ |
| I | 83.1 | $R_1$ = 166.789<br>-$R_2$ = 60.881 | $t_1$ = 5.0 | $S_1$ = 0.5 | 1.541 | 47.3 |
| II | -17.8 | -$R_3$ = 100.016<br>-$R_4$ = 22.711 | $t_2$ = 3.5 | $S_2$ = 28.5 | 1.617 | 36.6 |
| III | 14.8 | $R_5$ = 10.79<br>$R_6$ = 17.99 | $t_3$ = 1.5 | $S_3$ = 6.0 | 1.5582 | 67.8 |
| IV | -24.3 | -$R_7$ = 12.139<br>-$R_8$ = 11.32 | $t_4$ = 3.64 | $S_4$ = 0.5 | 1.511 | 63.5 |
| V | -47.0 | -$R_9$ = 46.23<br>$R_{10}$ = 17.25 | $t_5$ = 0.76 | $S_5$ = 4.25 | 1.621 | 36.2 |
| VI | 20.1 | $R_{11}$ = 10.88<br>$R_{12}$ = 15.399<br>-$R_{13}$ = 29.46 | $t_6$ = 0.76<br>$t_7$ = 2.10 | $S_6$ = 1.32<br>$S_7$ = 22.18 | 1.649<br>1.511 | 33.8<br>63.6 |

FIG. 2

*INVENTOR.*
WALTER MANDLER

BY *Frank C. Parker*

ATTORNEY

United States Patent Office 3,190,175
Patented June 22, 1965

3,190,175
WIDE ANGLE PHOTOGRAPHIC OBJECTIVE
Walter Mandler, Midland, Ontario, Canada, assignor to Bausch & Lomb Incorporated, Rochester, N.Y., a corporation of New York
Filed Oct. 22, 1962, Ser. No. 232,028
8 Claims. (Cl. 88—57)

The present invention relates to photographic objectives of the reversed telephoto type and more particularly relates to improvements therein.

In objectives of the reversed telephoto type, difficulty is experienced by optical designers when attempting to provide high-grade objectives of this kind which have a satisfactory extra long back focus, large useful field and large relative aperture while simultaneously achieving a high degree of correction for all chromatic and monochromatic aberrations as well as low distortion, flat field, and absence of coma and astigmatism.

It is an object of this invention to provide a novel photographic or similar objective of the reversed telephoto or wide angle type having an extra long back focal length of at least twice the equivalent focal length together with a total field angle of substantially 64° and a relative aperture of at least f/2.8, said objective having low distortion of the image produced thereby.

Another object of this invention is to provide such an objective which has excellent correction of substantially all chromatic and monochromatic image aberrations while achieving a superior condition for coma, astigmatism and flatness of field, the performance thereof being diffraction limited up to substantially 70% of the total field for a given focal length of about 11 mm.

Further objects and advantages of this invention will be apparent to those skilled in the art from a study of the specification hereinbelow taken together with the accompanying drawing, wherein:

FIG. 1 is an optical diagram of a preferred form of the present invention; and

FIG. 2 is a chart showing a set of numerical values for the constructional data related to the objective shown in FIG. 1.

The objective as above outlined is generally designated by the numeral 10 in FIG. 1 of the drawing and said objective is characterized by a front dispersive group of lenses designated by the numeral 12 and a collective group of lenses rearwardly thereof which is designated by the numeral 13, said groups being separated by an interposed diaphragm 14. The form of the lens parts is now described. The lens lying nearest to the entrant light is a double convex lens designated I, said lens being followed rearwardly by an air spaced double concave compound lens which is designated II. In the rear lens group 13 the foremost lens is located adjacent to the rear side of the diaphragm 14 and this lens is a double convex singlet lens which is designated III. Lens III is followed rearwardly by an air spaced negative meniscus lens which is designated IV. Rearwardly spaced from the meniscus lens IV is a second negative meniscus lens which is designated V and this lens is followed rearwardly by an air spaced double convex lens VI.

In the development of the present objective, the distribution of powers of the individual lenses has been found to be an important factor in achieving the objects of this invention, particularly an extra long back focal length of at least twice the equivalent focal length of the objective, and the necessary range of values of the individual focal lengths is given in the table herebelow wherein the individual focal lengths are designated $F_I$ to $F_{VI}$ respectively, related to the successive lens members which are designated as above I to VI.

$6.79F < F_I < 8.30F$
$1.458F < F_{II} < 1.778F$
$1.214F < F_{III} < 1.474F$
$1.993F < -F_{IV} < 2.433F$
$3.85F < -F_V < 4.69F$
$1.637F < F_{VI} < 1.997F$

In the above table of values, the minus (—) sign designates negative power. Furthermore, the necessary range of values for the successive lens thicknesses which relate to the successive lens elements is given in the table of mathematical expressions herebelow wherein said successive lens thicknesses are designated $t_1$ to $t_7$, and the successive interlens air spaces for the values are designated by $S_1$ to $S_6$.

$.413F < t_1 < .503F$
$.287F < t_2 < .349F$
$.1227F < t_3 < .1399F$
$.298F < t_4 < .364F$
$.0522F < t_5 < .076F$
$.0522F < t_6 < .076F$
$.172F < t_7 < .210F$
$.0413F < S_1 < .0503F$
$2.33F < S_2 < 2.85F$

Diaphragm $.492F < S_3 < .610F$
$.0413F < S_4 < .0503F$
$.340F < S_5 < .414F$
$.1078F < S_6 < .1316F$ The parameters as above given may be more specifically stated in the table of mathematical statements given herebelow wherein the designations for focal lengths, lens thicknesses, and air spaces are the same as above.

$F_I = 7.55F$        $-F_{IV} = 2.213F$
$-F_{II} = 1.1618F$  $-F_V = 4.27F$
$F_{III} = 1.344F$   $F_{VI} = 1.817F$ said values being stated in terms of the equivalent focal length designated F of the objective, the axial thicknesses of the successive lens parts being denoted $t_1$ to $t_7$, and the successive interlens air spaces which are represented by $S_1$ to $S_6$ having values which substantially as specified in the table of mathematical expressions herebelow, $t_1 = .458F$       $S_1 = .0458F$
$t_2 = .318F$       $S_2 = 2.59F$
$t_3 = .1363F$      Diaphragm
$t_4 = .331F$       $S_3 = .546F$
$t_5 = .0691F$      $S_4 = .0458F$
$t_6 = .0691F$      $S_5 = .377F$
$t_7 = .191F$       $S_6 = .1197F$ As a further specification of the parameters of the optical parts in objective 10, the range of values which have been found most successful for the radii of the lens surfaces $R_1$ to $R_{13}$ are given in the table herebelow wherein the minus (—) sign applies to all lens surfaces which have their centers of curvature located on the object side of the vertex of said surfaces.

$13.65F < R_1 < 16.67F$
$4.98F < -R_2 < 6.08F$
$8.19F < -R_3 < 10.01F$
$1.859F < -R_4 < 2.271F$
$.886F < R_5 < 1.080F$
$1.464F < R_6 < 1.800F$
$.994F < -R_7 < 1.214F$
$.93F < -R_8 < 1.13F$
$3.762F < -R_9 < 4.598F$
$1.452F < R_{10} < 1.786F$
$.888F < R_{11} < 1.084F$
$1.263F < R_{12} < 1.543F$
$2.417F < R_{13} < 2.953F$

A corresponding table of ranges of values is given for the refractive index and Abbe number of the lens materials which are designated, respectively, $n_D$ and $\nu$ in the table herebelow:

$1.535 < n_D(\text{Lens I}) < 1.550$
$1.612 < n_D(\text{Lens II-pos.}) < 1.625$

One successful form of the objective 10 has been constructed having specific values for the above-mentioned lens parameters which are given in the chart of values herebelow wherein $R_1$ to $R_{13}$, $F_I$ to $F_{VI}$, $t_1$ to $t_7$, $S_1$ to $S_6$, $n_D$ and $\nu$ all have the same designations as given in the data hereabove.

[E.F.L.=11.0 mm.  B.F.L.=22.2 mm.  Field angle=64°  Rel. aperture=f/2.8]

| Lens | Focal Length | Radii | Thickness | Spaces | $n_D$ | $\nu$ |
|---|---|---|---|---|---|---|
| I | $F_I$=83.1 | $R_1$=166.789 | $t_1$=5.0 | | 1.541 | 47.3 |
| | | $-R_2$=60.881 | | $S_1$=0.5 | | |
| II | $F_{II}$=−17.8 | $-R_3$=100.016 | $t_2$=3.5 | | 1.617 | 36.6 |
| | | $-R_4$=22.711 | $t_3$=1.5 | | 1.5582 | 67.8 |
| | | $R_5$=10.79 | | $S_2$=28.5 Diaphragm $S_3$=6.0 | | |
| III | $F_{III}$=14.8 | $R_6$=17.99 | $t_4$=3.64 | | 1.511 | 63.5 |
| | | $-R_7$=12.139 | | $S_4$=0.52 | | |
| IV | $F_{IV}$=−24.3 | $-R_8$=11.32 | $t_5$=.76 | | 1.621 | 36.2 |
| | | $-R_9$=46.23 | | $S_5$=4.25 | | |
| V | $F_V$=−47.4 | $R_{10}$=17.25 | $t_6$=.76 | | 1.649 | 33.8 |
| | | $R_{11}$=10.83 | | $S_6$=1.32 | | |
| VI | $F_{VI}$=20.1 | $R_{12}$=15.399 | $t_7$=2.10 | | 1.511 | 63.6 |
| | | $-R_{13}$=29.46 | | | | |

$1.553 < n_D(\text{Lens II-neg.}) < 1.565$
$1.505 < n_D(\text{Lens III}) < 1.518$
$1.615 < n_D(\text{Lens IV}) < 1.626$
$1.641 < n_D(\text{Lens V}) < 1.660$
$1.505 < n_D(\text{Lens VI}) < 1.518$
$42.0 < \nu(\text{Lens I}) < 52.0$
$32.0 < \nu(\text{Lens II-pos.}) < 42.0$
$62.0 < \nu(\text{Lens II-neg.}) < 72.0$
$58.0 < \nu(\text{Lens III}) < 70.0$
$33.0 < \nu(\text{Lens IV}) < 38.0$
$31.0 < \nu(\text{Lens V}) < 35.0$
$58.0 < \nu(\text{Lens VI}) < 70.0$ The above-specified values for the radii of the lens surfaces and the refractive index and Abbe number are stated more specifically in the consolidated table of values given herebelow, the radius $R_4$ having strong collective power which contributes advantageously toward correction of distortion in the image in the outer parts of the field of view.

$R_1 = 15.16F$
$-R_2 = 5.53F$
$-R_3 = 9.10F$
$-R_4 = 2.065F$
$R_5 = .982F$
$R_6 = 1.637F$
$-R_7 = 1.104F$
$-R_8 = 1.03F$
$-R_9 = 4.18F$
$R_{10} = 1.624F$
$R_{11} = .986F$
$R_{12} = 1.403F$
$-R_{13} = 2.685F$ $n_D(\text{Lens I}) = 1.541$
$n_D(\text{Lens II-pos.}) = 1.617$
$n_D(\text{Lens II-neg.}) = 1.5582$
$n_D(\text{Lens III}) = 1.511$
$n_D(\text{Lens IV}) = 1.621$
$n_D(\text{Lens V}) = 1.649$
$n_D(\text{Lens VI}) = 1.511$
$\nu(\text{Lens I}) = 47.3$
$\nu(\text{Lens II-pos.}) = 36.6$
$\nu(\text{Lens II-neg.}) = 67.8$
$\nu(\text{Lens III}) = 63.5$
$\nu(\text{Lens IV}) = 36.2$
$\nu(\text{Lens V}) = 33.8$
$\nu(\text{Lens VI}) = 63.6$ wherein E.F.L. and B.F.L. designate respectively the equivalent focal length and the back focal length of said objective 10.

It will be seen that there is here provided a wide angle or reversed telephoto type of objective which fulfills the objects of this invention and although only a preferred embodiment is given specifically, it will be understood that the parameters may be varied within reasonable ranges of values, and substitutions may be made therein without departing from the spirit of this invention as defined in the appended claims.

What is claimed is:

1. A wide angle photographic objective having a relative aperture at least as large as $f/2.8$ and a field angle of substantially 64° and an extra long back focal length at least as great as twice the equivalent focal length of the objective, said objective having excellent correction of all chromatic and monochromatic aberrations, coma, astigmatism, and distortion and comprising a dispersive front lens group and a collective rear lens group, said groups being spaced on opposite sides of an interposed diaphragm in optical alignment with each other, said front group comprising a positive singlet lens designated I which is located at the object end of the objective and a negative compound lens designated II and spaced rearwardly of the positive lens, said rear group comprising a second positive singlet lens designated III which is located adjacent to the rear side of said diaphragm, a meniscus single negative lens which is designated IV and is spaced rearwardly from said second positive singlet lens and has a concave surface turned toward said diaphragm, said rear group further comprising a second meniscus singlet negative lens designated V which is spaced rearwardly of the first singlet negative lens and is concave toward the image, and a rearmost positive single lens designated VI which is spaced from the last-named meniscus lens, the focal lengths which are designated $F_I$ to $F_{VI}$ for the aforementioned lens members I to VI respectively having values as given in the table of mathematical expressions herebelow, $$6.79F < F_I < 8.30F$$
$$1.458F < -F_{II} < 1.778F$$
$$1.214F < F_{III} < 1.474F$$
$$1.993F < -F_{IV} < 2.433F$$
$$3.85F < -F_V < 4.69F$$
$$1.637F < F_{VI} < 1.997F$$

said values being stated in terms of the equivalent focal length designed F of the entire objective, the axial thicknesses of the successive lens parts being denoted $t_1$ to $t_7$ and the successive interlens air spaces which are represented by $S_1$ to $S_6$ having values which are specified by the table of mathematical expressions herebelow, $$.413F < t_1 < .503F$$
$$.287F < t_2 < .349F$$
$$.1227F < t_3 < .1399F$$
$$.298F < t_4 < .364F$$
$$.0522F < t_5 < .076F$$
$$.0522F < t_6 < .076F$$
$$.172F < t_7 < .210F$$
$$.0413F < S_1 < .0503F$$
$$2.33F < S_2 < 2.85F$$

Diaphragm $$.492F < S_3 < .610F$$
$$.0413F < S_4 < .0503F$$
$$.340F < S_5 < .414F$$
$$.1078F < S_6 < .1316F$$

2. A wide angle photographic objective as set forth in claim 1 further characterized by values for the refractive index $n_D$ and Abbe number of the lens materials being within the ranges specified in the table of mathematical expressions herebelow, $$1.535 < n_D(\text{Lens I}) < 1.550$$
$$1.612 < n_D(\text{Lens II-pos.}) < 1.625$$
$$1.553 < n_D(\text{Lens II-neg.}) < 1.565$$
$$1.505 < n_D(\text{Lens III}) < 1.518$$
$$1.615 < n_D(\text{Lens IV}) < 1.626$$
$$1.641 < n_D(\text{Lens V}) < 1.660$$
$$1.505 < n_D(\text{Lens VI}) < 1.518$$
$$42.0 < \nu(\text{Lens I}) < 52.0$$
$$32.0 < \nu(\text{Lens II-pos.}) < 42.0$$
$$62.0 < \nu(\text{Lens II-neg.}) < 72.0$$
$$58.0 < \nu(\text{Lens III}) < 70.0$$
$$33.0 < \nu(\text{Lens IV}) < 38.0$$
$$31.0 < \nu(\text{Lens V}) < 35.0$$
$$58.0 < \nu(\text{Lens VI}) < 70.0$$

3. A wide angle photographic objective as set forth in claim 1 further characterized by values for the radii of the lens surfaces designated $R_1$ to $R_{13}$, numbering from the front of the objective and relating to the successive lens members I to VI being specified by mathematical statements given in the table herebelow, said values being given in terms of the equivalent focal length designated F of the objective, $$13.65F < R_1 < 16.67F$$
$$4.98F < -R_2 < 6.08F$$
$$8.19F < -R_3 < 10.01F$$
$$1.859F < -R_4 < 2.271F$$
$$.886F < R_5 < 1.080F$$
$$1.464F < R_6 < 1.800F$$
$$.994F < -R_7 < 1.214F$$
$$.93F < -R_8 < 1.13F$$
$$3.762F < -R_9 < 4.598F$$
$$1.452F < R_{10} < 1.786F$$
$$.888F < R_{11} < 1.084F$$
$$1.263F < R_{12} < 1.543F$$
$$2.417F < -R_{13} < 2.953F$$

wherein the minus (−) sign applies to all lens surfaces having their centers of curvature located on the object side of the vertex of said surfaces.

4. A wide angle photographic objective having a relative aperture at least as large as $f/2.8$ and a field angle of 64°, and an extra long back focal length of at least twice the equivalent focal length of the objective, said objective having execellent correction of all chromatic and monochromatic aberrations, coma, astigmatism and distortion and comprising a dispersive front lens group and a collective rear lens group which are spaced on opposite sides of an interposed diaphragm in optical alignment with each other, said front group comprising a positive singlet lens which is designated I and is located on the object end of the objective, and a negative compound lens designated II and spaced rearwardly thereof, said rear group comprising a forward positive singlet lens which is designated III and is located adjacent to the rear side of said diaphragm, a meniscus singlet negative lens which is spaced rearwardly from the second positive singlet lens, said lens being designated IV and having a concave side facing said diaphragm, said rear group further comprising a singlet negative meniscus lens which is designated V and is spaced rearwardly of the first said singlet negative lens and is concave toward the image, and a rearmost positive singlet lens which is designated VI and is spaced from the last-named meniscus lens, the focal lengths which are designated $F_I$ to $F_{VI}$ of the aforementioned lens members I to VI respectively having values substantially as given in the table of mathematical expressions herebelow,

| | |
|---|---|
| $F_I = 7.55F$ | $-F_{VI} = 2.213F$ |
| $-F_{II} = 1.618F$ | $-F_V = 4.27F$ |
| $F_{III} = 1.344F$ | $F_{VI} = 1.817F$ | said values being stated in terms of the equivalent focal length designated F of the objective, the axial thicknesses of the successive lens parts being denoted $t_1$ to $t_7$, and the successive interlens air spaces which are represented by $S_1$ to $S_6$ having values which are substantially as specified in the table of mathematical expressions herebelow,

| | |
|---|---|
| $t_1 = .458F$ | $S_1 = .0458F$ |
| $t_2 = .318F$ | $S_2 = 2.59F$ |
| $t_3 = .1363F$ | Diaphragm |
| $t_4 = .331F$ | $S_3 = .546F$ |
| $t_5 = .0691F$ | $S_4 = .0458F$ |
| $t_6 = .0691F$ | $S_5 = .377F$ |
| $t_7 = .191F$ | $S_6 = .1197F$ |

5. A wide angle photographic objective as set forth in claim 4 further characterized by values for the refractive index $n_D$ and Abbe number $\nu$ of the lens materials being substantially as specified in the table of mathematical statements herebelow, $$n_D \text{ (Lens I)} = 1.541$$
$$n_D \text{ (Lens II-pos.)} = 1.617$$
$$n_D \text{ (Lens II-neg.)} = 1.5582$$
$$n_D \text{ (Lens III)} = 1.511$$
$$n_D \text{ (Lens IV)} = 1.621$$
$$n_D \text{ (Lens V)} = 1.649$$
$$n_D \text{ (Lens VI)} = 1.511$$
$$\nu \text{ (Lens I)} = 47.3$$
$$\nu \text{ (Lens II-pos.)} = 36.6$$
$$\nu \text{ (Lens II-neg.)} = 67.8$$
$$\nu \text{ (Lens III)} = 63.5$$
$$\nu \text{ (Lens IV)} = 36.2$$
$$\nu \text{ (Lens V)} = 33.8$$
$$\nu \text{ (Lens VI)} = 63.6$$

6. A wide angle photographic objective having a relative aperture at least as large as $f/2.8$ and an extra long back focal length at least twice the equivalent focal length of the objective, said objective comprising a dispersive front lens group and a collective rear lens group which are spaced on opposite sides of an interposed diaphragm in optical alignment with each other, said front group comprising a positive singlet lens which is designated I and is located at the object end of the objective, and a negative compound lens which is designated II and is spaced rearwardly thereof, said rear group comprising a forward positive singlet lens which is designated III and is located adjacent to the rear side of said diaphragm, a meniscus singlet negative lens which is spaced rearwardly from the second positive singlet lens, said lens being designated IV and having a concave side facing said diaphragm, said rear group further comprising a singlet negative meniscus lens which is designated V and is spaced rearwardly of the first said singlet negative lens and is concave toward the image, and a rearmost positive singlet lens which is designated VI and is spaced from the last-named meniscus lens, the values for the radii of the lens surfaces which are designated $R_1$ to $R_{13}$, numbering from the front of the objective and relating to the successive lens members I to VI being specified by the mathematical statements given in the table herebelow, said values being given substantially in terms of the equivalent focal length designated F of the objective, the minus (−) sign applying to all lens surfaces which have their centers of curvature located on the object side of the vertex of said surfaces, $R_1 = 15.16F$      $-R_8 = 1.03F$
$-R_2 = 5.53F$      $-R_9 = 4.18F$
$-R_3 = 9.10F$      $R_{10} = 1.624F$
$-R_4 = 2.065F$      $R_{11} = .986F$
$R_5 = .982F$      $R_{12} = 1.403F$
$R_6 = 1.637F$      $-R_{13} = 2.685F$
$-R_7 = 1.104F$ the axial thicknesses of the successive lens parts being denoted $t_1$ to $t_7$, and the successive interlens air spaces which are represented by $S_1$ to $S_6$ having values which are substantially as specified in the table of mathematical statements herebelow, $t_1 = .458F$      $S_1 = .0458F$
$t_2 = .318F$      $S_2 = 2.59F$
$t_3 = .1363F$      Diaphragm
$t_4 = .331F$      $S_3 = .546F$
$t_5 = .0691F$      $S_4 = .0458F$
$t_6 = .0691F$      $S_5 = .377F$
$t_7 = .191F$      $S_6 = .1197F$ 7. A wide angle photographic objective as set forth in claim 6 further characterized by values for the refractive index $n_D$ and Abbe number $\mu$ of the lens materials being substantially as specified in the table of mathematical statements herebelow, $n_D$ (Lens I) = 1.541      $\nu$ (Lens I) = 47.3
$n_D$ (Lens II-pos.) = 1.617      $\nu$ (Lens II-pos.) = 36.6
$n_D$ (Lens II-neg.) = 1.5582      $\nu$ (Lens-neg.) = 67.8
$n_D$ (Lens III) = 1.511      $\nu$ (Lens III) = 63.5
$n_D$ (Lens IV) = 1.621      $\nu$ (Lens IV) = 36.2
$n_D$ (Lens V) = 1.649      $\nu$ (Lens V) = 33.8
$n_D$ (Lens VI) = 1.511      $\nu$ (Lens VI) = 63.6

8. A wide angle photographic objective having an extra long back focal length and being composed of a sequence of six lens members, two of which comprise a front lens group which is separated from the remaining lens members in the rear group by a diaphragm, the constructional data for said objective being given in the chart of values herebelow wherein the six lens members are designated I to VI, the successive radii of the lens surfaces being designated $R_1$ to $R_{13}$ wherein $-R_4$ is the radius of a cemented interface in a compound lens member II, the successive thicknesses of the lens elements being represented by $t_1$ to $t_7$, the successive air spaces between said members being designated $S_1$ to $S_6$, and the refractive index $n_D$ and Abbe number $\nu$ of the lens materials of said elements have values as specified in the chart herebelow wherein the minus (−) signs used with the R designations mean that the centers of curvature of the lens surfaces are located on the object side of the vertex thereof, scalar dimensions being given in millimeters.

[E.F.L. = 11.0 mm.   B.F.L. = 22.2 mm.   Field angle = 64°   Rel. aperture = f/2.8]

| Lens | Focal Length | Radii | Thickness | Spaces | $n_D$ | $\nu$ |
|---|---|---|---|---|---|---|
| I | $F_I = 83.1$ | $R_1 = 166.789$ | $t_1 = 5.0$ | | 1.541 | 47.3 |
| | | $-R_2 = 60.881$ | | $S_1 = 0.5$ | | |
| II | $F_{II} = -17.8$ | $-R_3 = 100.016$ | $t_2 = 3.5$ | | 1.617 | 36.6 |
| | | $-R_4 = 22.711$ | $t_3 = 1.5$ | | 1.5582 | 67.8 |
| | | $R_5 = 10.79$ | | $S_2 = 28.5$ Diaphragm $S_3 = 6.0$ | | |
| III | $F_{III} = 14.8$ | $R_6 = 17.99$ | $t_4 = 3.64$ | | 1.511 | 63.5 |
| | | $-R_7 = 12.139$ | | $S_4 = 0.52$ | | |
| IV | $R_{IV} = -24.3$ | $-R_8 = 11.32$ | $t_5 = .76$ | | 1.621 | 36.2 |
| | | $-R_9 = 46.23$ | | $S_5 = 4.25$ | | |
| V | $F_V = -47.4$ | $R_{10} = 17.25$ | $t_6 = .76$ | | 1.649 | 33.8 |
| | | $R_{11} = 10.83$ | | $S_6 = 1.32$ | | |
| VI | $F_{VI} = 20.1$ | $R_{12} = 15.399$ | $t_7 = 2.10$ | | 1.511 | 63.3 |
| | | $-R_{13} = 29.46$ | | | | | wherein E.F.L. and B.F.L. designate respectively the equivalent focal length and back focal length of said objective.

References Cited by the Examiner
UNITED STATES PATENTS 2,594,020   4/52   Hopkins et al. _____ 88—57
2,724,993   11/55   Cook _____ 88—57
3,016,799   1/62   Klemt et al. _____ 88—57

JEWELL H. PEDERSEN, *Primary Examiner.*

JOHN K. CORBIN, *Examiner.*

UNITED STATES PATENT OFFICE
CERTIFICATE OF CORRECTION

Patent No. 3,190,175                                    June 22, 1965

Walter Mandler

It is hereby certified that error appears in the above numbered patent requiring correction and that the said Letters Patent should read as corrected below.

Column 2, line 2, for "$F_{II}$" read -- $-F_{II}$ --; line 42, after "which" insert -- are --; column 4, line 72, for "single" read -- singlet --; column 6, line 33, for "$-F_{VI}$" read -- $-F_{IV}$ --.

Signed and sealed this 30th day of November 1965.

(SEAL)
Attest:

ERNEST W. SWIDER                                EDWARD J. BRENNE
Attesting Officer                                    Commissioner of Patents